(12) United States Patent
Lee et al.

(10) Patent No.: US 9,748,536 B2
(45) Date of Patent: Aug. 29, 2017

(54) BATTERY PACK

(71) Applicant: SAMSUNG SDI CO., LTD., Yongin-si, Gyeonggi-do (KR)

(72) Inventors: Sang-Joo Lee, Yongin-si (KR); Heui-Sang Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 210 days.

(21) Appl. No.: 14/451,302

(22) Filed: Aug. 4, 2014

(65) Prior Publication Data

US 2015/0037661 A1    Feb. 5, 2015

(30) Foreign Application Priority Data

Aug. 5, 2013 (KR) .......................... 10-2013-0092558

(51) Int. Cl.
*H01M 10/052* (2010.01)
*H01M 2/10* (2006.01)

(52) U.S. Cl.
CPC ...... *H01M 2/1061* (2013.01); *H01M 2220/30* (2013.01)

(58) Field of Classification Search
CPC ........................... H01M 10/425; H01M 10/052
See application file for complete search history.

(56) References Cited

U.S. PATENT DOCUMENTS

| | | | |
|---|---|---|---|
| 2005/0158621 A1* | 7/2005 | Benoit | H01M 6/5066 429/178 |
| 2006/0068281 A1 | 3/2006 | Hiratsuka et al. | |
| 2008/0081254 A1* | 4/2008 | Kim | H01M 2/1061 429/163 |
| 2010/0209743 A1* | 8/2010 | Koh | H01M 2/0404 429/7 |
| 2011/0091747 A1* | 4/2011 | Park | H01M 2/1061 429/7 |

FOREIGN PATENT DOCUMENTS

| | | |
|---|---|---|
| KR | 10-2011-0105640 | 9/2011 |
| WO | WO 2004/055924 A1 | 7/2004 |

* cited by examiner

*Primary Examiner* — Olatunji Godo
(74) *Attorney, Agent, or Firm* — Lewis Roca Rothgerber Christie LLP

(57) ABSTRACT

A battery pack includes one or more bare battery cells, a frame case, and a top case. Each of the bare battery cells has first and second electrode tabs. The frame case surrounds an outer surface of the one or more bare cells. The top case is coupled to the frame case at one end of the one or more bare cells. In the battery pack, the frame case includes a warp preventing portion parallel to the top case.

16 Claims, 6 Drawing Sheets

BATTERY PACK

CROSS-REFERENCE TO RELATED APPLICATION

This application claims priority to and the benefit of Korean Patent Application No. 10-2013-0092558, filed on Aug. 5, 2013, in the Korean Intellectual Property Office, the entire disclosure of which is incorporated herein in its entirety by reference.

BACKGROUND

1. Field

An aspect of the present invention relates to a battery pack.

2. Description of the Related Art

Secondary batteries using a non-aqueous electrolyte have been used as power sources for a variety of portable electronic devices. As portable electronic devices are used in various fields, the demand for secondary batteries has rapidly increased. Secondary batteries can be reversibly discharged/recharged a plurality of times, and are, thus, both economical and environmentally efficient. Accordingly, the use of secondary batteries has gained increasing popularity.

As portable electronic devices are expected to be small in size and lightweight, the secondary batteries powering these devices are also expected to be small in size and lightweight. However, decreasing the size and/or weight of a secondary battery may affect its safety and reliability or deteriorate the capacity of the secondary battery.

SUMMARY

One or more embodiments of the present invention include a battery pack having improved strength.

One or more embodiments of the present invention also include a battery pack having simplified components, resulting in increased productivity and processability during manufacturing and/or operation.

According to an aspect of the present invention, a battery pack includes one or more bare cells, each bare cell having first and second electrode tabs, a frame case surrounding an outer surface of the one or more bare cells, and a top case coupled to the frame case at one end of the one or more bare cells, wherein the frame case includes a warp preventing portion parallel to the top case.

The frame case may include a rectangular section having a major axis and a perpendicular minor axis, and the warp preventing portion may be recessed inward from an outer surface of the frame case. The warp preventing portion may be adjacent to a central portion of the major axis.

The frame case may include opposite first and second frame portions.

Each bare cell may include a wide surface having a pair of minor axes opposite to each other and a perpendicular pair of major axes opposite to each other.

Each of the first and second frame portions may include a base portion facing the wide surface of the one or more bare cells, and a side portion at each respective end of the base portion surrounding side surfaces of the one or more bare cells.

The base portion may include a resin material surrounding upper and lower surfaces of a steel material such that the steel material is between the upper and lower surfaces of resin material, and wherein the side portion includes resin material coupled to the base portion at an end portion.

The frame case may include the steel material and the resin material, and may be formed through insert injection molding.

The side portion may be rounded.

Each of the first and second frame portions may include a warp preventing portion. The warp preventing portions of each of the first and second frame portions may be configured to connect to each other when the first and second frame portions are coupled to each other.

The warp preventing portion may traverse the side portion and connect to at least a portion of the base portion.

The frame case may further include one or more protruding portions extending vertically parallel to the major axis of the frame case and protruding perpendicular to the warp preventing portions.

The base portion may include the one or more protruding portions, the one or more protruding portions protruding further out from the base portion than each of the first and second frame portions The warp preventing portion may be at an outer surface of the frame case.

The warp preventing portion may at least partially expose the steel material of the base portion.

The warp preventing portion may be vertical to the major axis direction of the one or more bare cells.

The warp preventing portion may include a plurality of warp preventing portions spaced apart from one another in the frame case.

The warp preventing portion may be stepped.

The warp preventing portion may include first and second stepped portions. A depth of the second stepped portion may be greater than a depth of the first stepped portion.

Each bare cell may have a length of at least 50 mm in the major axis direction. At least one of the one or more bare cells may include a pouch-type secondary battery.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. These and/or other aspects of embodiments of the present invention will become apparent and more readily appreciated from the following description of the embodiments, taken in conjunction with the accompanying drawings of which.

DETAILED DESCRIPTION

Figure 1:
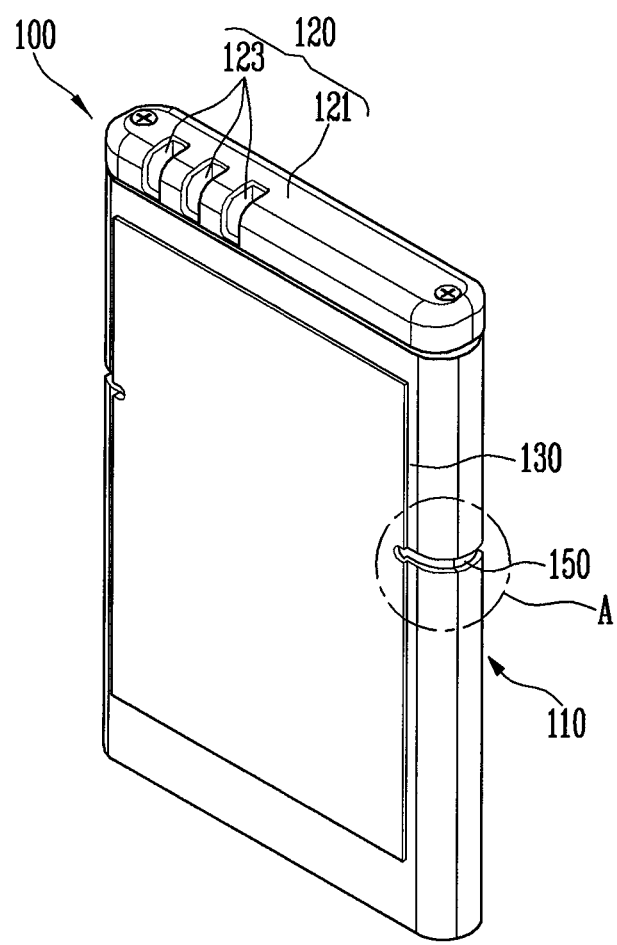
FIG. 1 is a front perspective view a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" an other element, it can be directly on the other element or be indirectly on the other element with one or more intervening elements interposed therebetween. Also, when an element is referred to as being "connected to" an other element, it can be directly connected to the other element or be indirectly connected to the other element with one or more intervening elements interposed therebetween. Hereinafter, like reference numerals refer to like elements.

Figure 2:
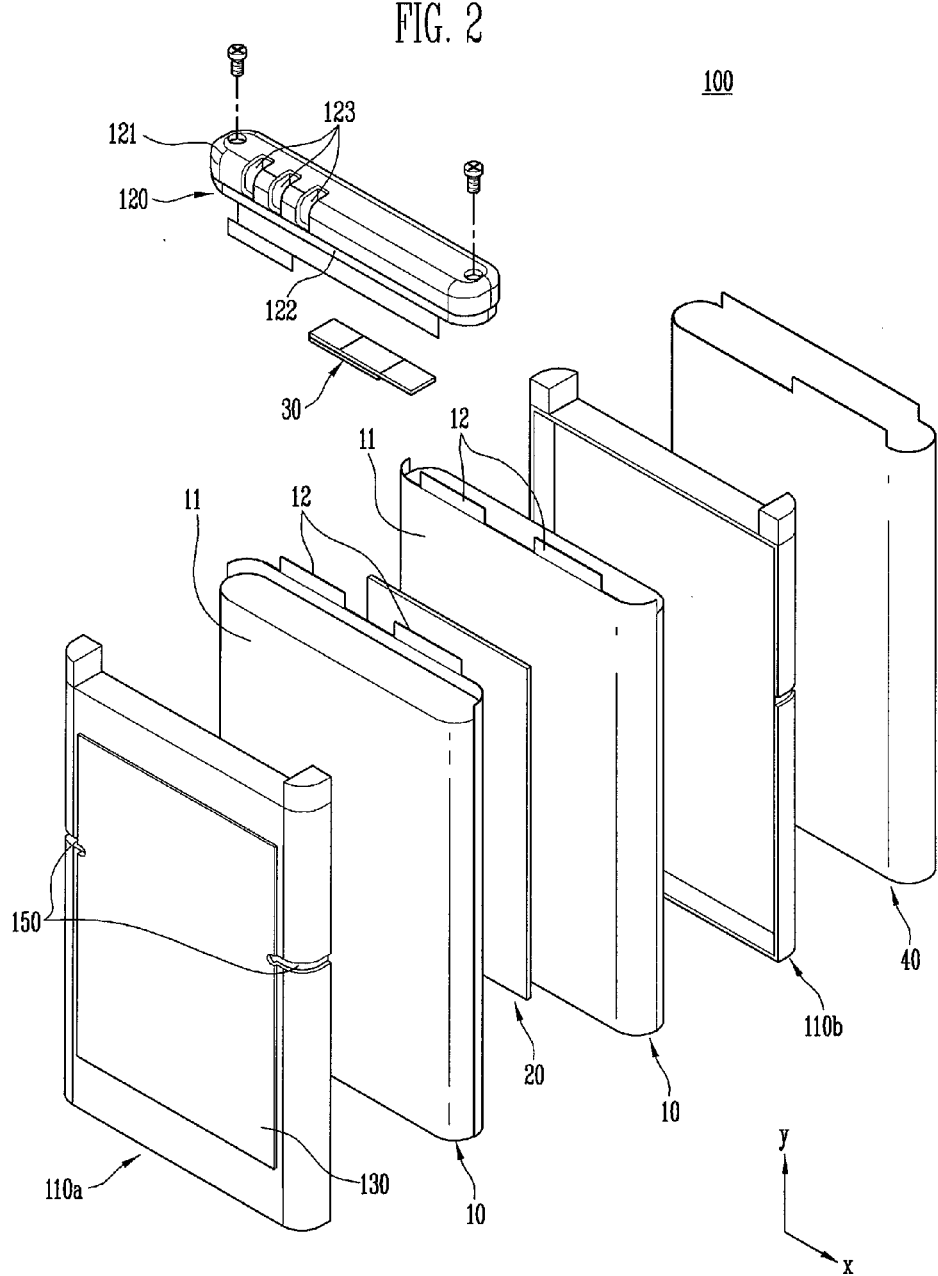
FIG. 2 is an exploded perspective view of the battery pack of FIG. 1.

FIG. 1 is a front perspective view a battery pack according to an embodiment of the present invention. FIG. 2 is an exploded perspective view of the battery pack of FIG. 1.

Referring to the embodiment shown in FIGS. 1 and 2, the battery pack 100 according to this embodiment includes one or more bare cells 10 each configured to have first and second electrode tabs 12; a frame case 110 surrounding an outer surface of each bare cell 10; and a top case 120 located at one end of each bare cell 10. The frame case 110 in this embodiment includes warp preventing portions 150 parallel to and spaced from the top case 120. The warp preventing portion 150 may be recessed compared to other peripheral portions of the frame case 110.

Each bare cell 10 may include an electrode assembly with first and second electrode tabs 12 having different polarities, and a case 11 configured to accommodate the electrode assembly therein. The electrode assembly may be accommodated in the case 11 such that the first and second electrode tabs 12 protrude outside of the case 11. The electrode assembly may include a positive electrode plate to which a positive electrode active material is applied, a negative electrode plate to which a negative electrode active material is applied, and a separator interposed between the positive and negative electrode plates. The positive and negative electrode plates in these embodiments generate electrochemical energy, using ions or electrons moving through pores in the separator. The electrochemical energy may be transferred to an exterior of the respective bare cell 10 through the first and second electrode tabs 12. The case 11 in this embodiment further accommodates an electrolyte, the electrolyte enabling the ions to flow smoothly. The case 11 may be formed from a sheet in which resin, metal, and resin are laminated. The external appearance of the case 11 may be formed by machining the sheet, etc. For example, in an embodiment, the case 11 may include a pouch-type case, and the bare cell 10 may be a pouch-type secondary battery.

As discussed above, the battery pack 100 may include one or more bare cells 10. In an embodiment, the battery pack 100 includes two bare cells 10, however, the present invention is not limited thereto. Each bare cell 10 may include wide surfaces having a pair of minor axes (x-axis) opposite each other and a pair of perpendicular major axes (y-axis) opposite each other. In the bare cell 10 of this embodiment, the wide surfaces may form a pair of minor axes facing each other. An adhesive member 20 shaped to correspond to the wide surface of the bare cell 10 may be located between two adjacent bare cells 10. The adhesive member 20 in this embodiment is located adjacent to a central portion of the wide surface of the respective pair of bare cells 10, fix the two bare cells 10 adjacent to each other.

The outer surface of each bare cell 10 may be surrounded by the frame case 110. The frame case 110 may include a pair of first and second frame portions 110a and 110b opposite to each other, and the bare cell 10 may be accommodated in a space formed when the first and second frame portions 110a and 110b are coupled to each other. In this embodiment, one or more adhesive members 20 may be located between the first and second frame portions 110a and 110b and the bare cell 10. The space formed by coupling the first and second frame portions 110a and 110b in these embodiments is configured to correspond to the size of the respective bare cell 10 located therein, stabling accommodating the bare cell 10 therein such that the bare cell 10 does not move inside, even without the adhesive member 20. The top case 120 may be mounted on at least one side of the frame case 110. When the bare cell 10 is accommodated inside the frame case 110, the first and second electrode tabs 12 of the bare cell 10 may protrude out of one end of the frame case 110. In addition, a label 40 may be provided on an outer surface of the frame case 110, the label 40 being configured to firmly affix the frame case 110, including the first and second frame portions 110a and 110b.

The top case 120 may be mounted on a portion of the frame case 110, to which the first and second electrode tabs 12 are connected. The top case 120 may include a protective circuit module 122 electrically connected to the first and second electrode tabs 12. In addition, a secondary protection element 30, such as a thermal fuse or positive temperature coefficient thermistor (PTC), may be provided between the protective circuit module 122 and the first or second electrode tab 12, thereby improving the safety of the battery pack 100. The top case 120 may include the protective circuit module 122 on which a protection element, such as an electronic device, etc., may be mounted, and an exterior material 121 surrounding the protective circuit module 122. The top case 120 may also include a terminal portion 123 through which energy generated in the bare cell 10 is transferred to an outside of the battery pack 100.

In the battery pack 100 according to the embodiment described above, the two bare cells 10 may be aligned such that the respective wide surfaces of the bare cells 10 face each other, and the two bare cells 10 may be accommodated in the frame case 110. The warp preventing portion 150 in this embodiment is configured to be recessed inward from the outer surface of the frame case 110. In this embodiment, the warp preventing portion 150 may be adjacent to a central portion of the major axis of the bare cell 10. For example, in an embodiment, the major axis of the bare cell 10 has a length of at least 50 millimeters (mm) or greater, and may include a pouch-type secondary battery.

In an embodiment where the battery pack 100 includes bare cells 10 of the pouch-type secondary battery-type, the bare cell 10 may further include a separate case surrounding its exterior, solidifying an exterior appearance of the bare cell 10 and providing a suitable shape for an external device in which the battery pack 100 may be employed. In this embodiment, the separate case may be formed of a material such as steel or stainless steel i.e., SUS M, and the frame case 110 may be formed of a separate resin R (SUS M and resin R are shown in the embodiment of FIG. 3C, for example). The SUS M may correspond to the wide surface of the bare cell 10, and the frame case 110 may be surround an outer surface of the SUS M and side surfaces of the bare cell 10. In the SUS M and the frame case 110, which may independently exist in the battery pack 100, a fixing member such as an adhesive may be separately added to affix the bare cell 10 and the SUS M, or the SUS M and the frame case 110, to each other. Therefore, the entire thickness of the battery pack 100 may be increased in these embodiments, and the material costs, accordingly, may also be increased. Further, the bare cell 10, the SUS M, and the frame case 110, in this embodiment, are necessarily aligned, therefore decreasing process efficiency. Particularly, in an embodiment where the major axis of the bare cell 10 has a length of 50 mm or greater, a failure such as warping of the frame case 110 may frequently occur during the process of manufacturing the frame case 110 through injection molding, for example.

In the battery pack 100 according to an embodiment, the adhesive member 20 between the pouch-type secondary battery bare cell 10 and the case separately provided at the outside of the bare cell are omitted. Further, exclusion of the separately provided case with the SUS M and the independently provided frame case 110 in this embodiment, is instead replace with an integrally formed frame case 110, thereby simplifying a manufacturing process of the battery pack 100. In this embodiment where the major axis of the bare cell 10 has a length of 50 mm or greater, a failure such as bending of the frame case 110 can be avoided, thereby improving productivity and process efficiency.

Figure 3A:
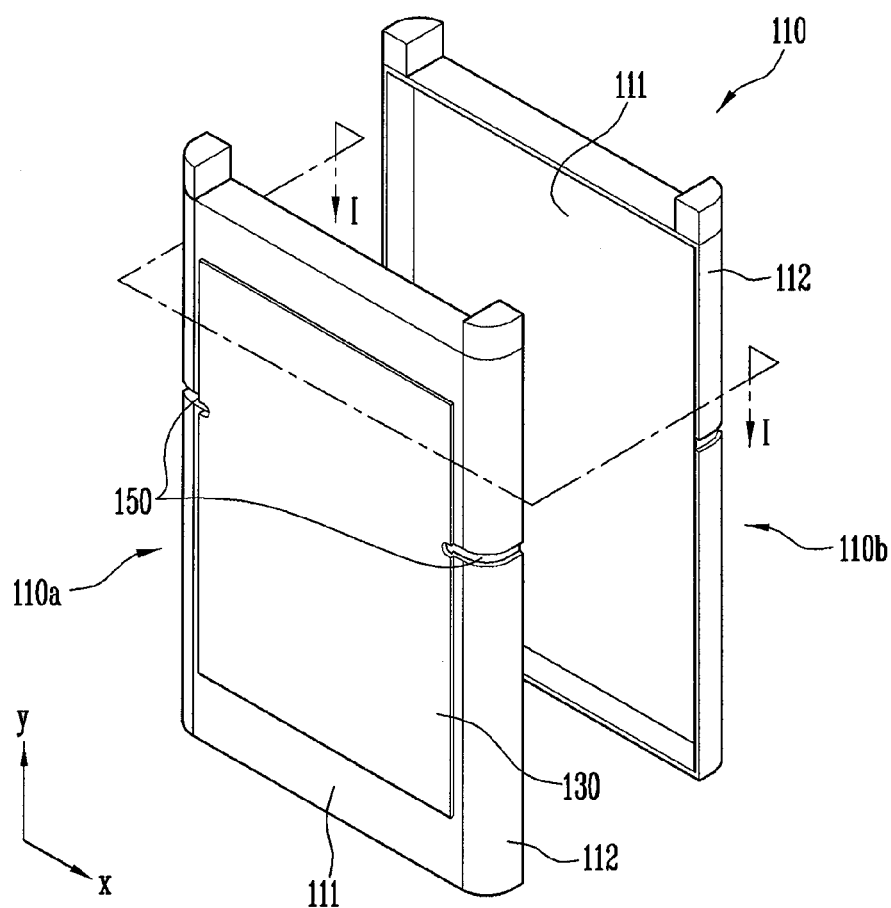
FIG. 3A is a perspective view of a frame case of the battery pack shown in FIG. 2.
Figure 3B:
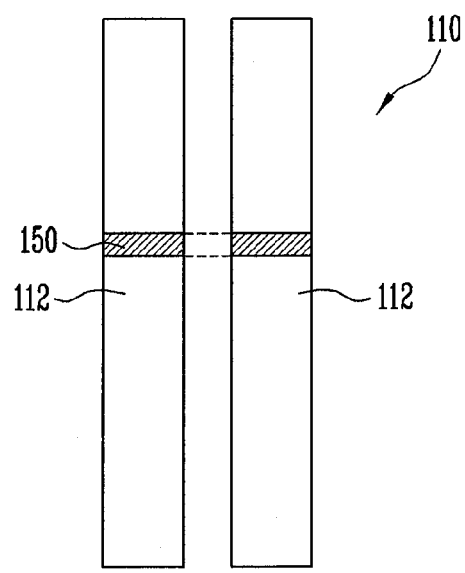
FIG. 3B is a side view of the frame case of FIG. 3A.
Figure 3C:
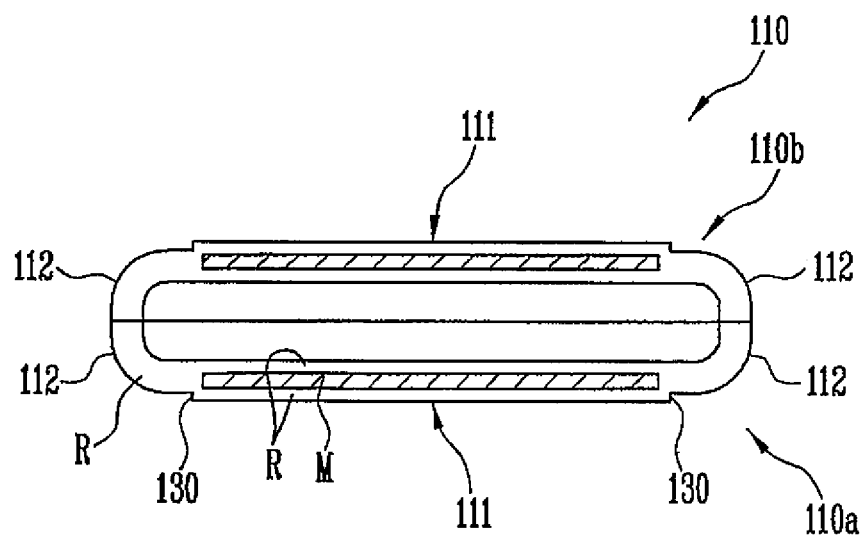
FIG. 3C is a cross-sectional view of the frame case taken along line I-I of FIG. 3A.
Figure 4:
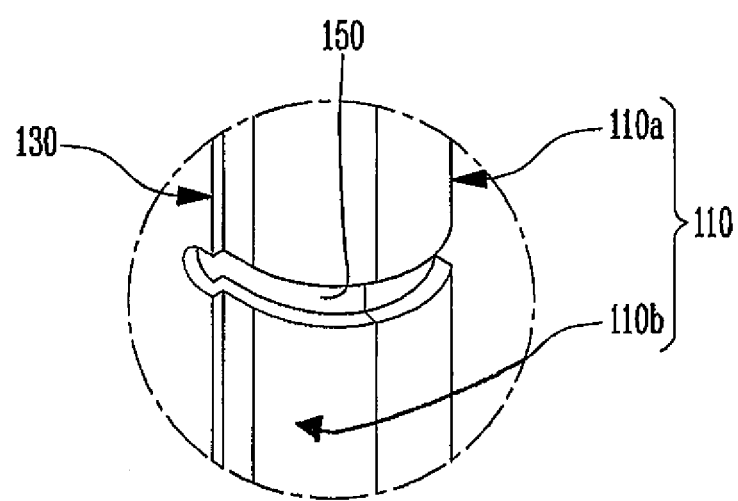
FIG. 4 is an enlarged view of portion A of the battery pack according to the embodiment of FIG. 1.

FIG. 3A is a perspective view of the frame case 110 of the battery pack 100 shown in FIG. 2. FIG. 3B is a side view of the frame case 110 of FIG. 3A. FIG. 3C is a cross-sectional view taken along line I-I of FIG. 3A. FIG. 4 is an enlarged view of portion A of the battery pack 100 according to the embodiment of FIG. 1.

Referring to embodiment shown in FIGS. 3A through 3C and FIG. 4, the frame case 110 includes a rectangular section having a major axis (y-axis) and a minor axis (x-axis), and the warp preventing portion 150 is recessed inward from the outer surface of the frame case 110. In this embodiment, the warp preventing portion 150 may be adjacent to a central portion of the major axis. A pair of first and second frame portions 110*a* and 110*b* opposite each other may be coupled to each other, forming the frame case 110 with a space configured to accommodate the bare cell 10 therein.

Each of the first and second frame portions 110*a* and 110*b* may include a base portion 111 facing the wide surface of the bare cell 10, and side portions 112 located at respective ends of the base portion 111 surrounding side surfaces of the bare cell 10. The side portions 112 may correspond to respective side, upper, and lower surfaces of the bare cell 10. Hereinafter, reference to the side portion 112 will refer to the side portion 12 corresponding to the side surface of the bare cell 10.

The base portions 111 of the first and second frame portions 110*a* and 110*b* in this embodiment face each other, and the side portions 112 of the first and second frame portions 110*a* and 110*b* engage with each other. Thus, ends of the side portions 112 may contact each other. In an embodiment, the base portion 111 may be planar, and the side portions 112 may be rounded. The side portion 112 of the first frame portion 110*a* and the side portion 112 of the second frame portion 110*b* may be formed such that the section of the side portions 112 in contact with each other form an approximate semicircular shape.

The warp preventing portions 150 may be located in the frame case 110. In this embodiment, the warp preventing portions 150 may be located at each respective side end portion of the frame case 110. In an embodiment where the bare cell 10 is accommodated inside the frame case 110, the warp preventing portions 150 may be vertical to the major axis of the bare cell 10. In an embodiment, the frame case 110 may be manufactured using insert injection molding, as described below. In an embodiment where the major axis of the frame case 110 has a predetermined length of 50 mm or greater, the frame case 110 may be warped after the insert injection molding. In the battery pack 100 according to this embodiment, the warp preventing portions 150 of the frame case 110 prevent deformation of the battery pack 100, and accordingly, a failure such as warping of the frame case 110 is avoided. Thus, when the bare cell 10 has a predetermined size of 50 mm or greater, e.g., when the major axis of the bare cell 10 has a length of 50 mm or more, a failure in an external appearance of the frame case 110 in which the bare cell 10 is accommodated can be prevented. Further, since a failure such as warping of the frame case 110 may be prevented, a thickness of the frame case 110 can accordingly be decreased, resulting in a smaller and more lightweight battery pack 100.

The warp preventing portions 150 may be provided in the first and second frame portions 110*a* and 110*b*, respectively. In an embodiment where the first and second frame portions 110*a* and 110*b* are coupled to each other, the warp preventing portions 150 provided in the first and second frame portions 110*a* and 110*b*, respectively, may be connected to each other. In this embodiment, the warp preventing portions 150 traverse the respective side portions 112 of the first and second frame portions 110*a* and 110*b* (in the x-direction). In this embodiment, the warp preventing portion 150 may connect with at least one portion of the base portion 111. The warp preventing portion 150 may be shaped such that the end of the warp preventing portion 150 connected to the base portion 111 is round. The warp preventing portion 150 in this embodiment is further recessed than peripheral portions of the first or second frame portion 110*a* or 110*b* of the frame case 110. In an embodiment where an external force is applied to the first and second frame portions 110*a* and 110*b*, cracks may occurs. However, since the warp preventing portion 150 according to this embodiment is round, cracking may be prevented where there is no apex portion to serve as a starting point of a crack. Thus, in the battery pack 100 according to this embodiment, cracks are not easily formed in the warp preventing portion 150, and durability of the battery pack 100 may be increased.

The frame case 110 may further include one or more protruding portions 130 extending vertically in a direction parallel to the major axis (y-axis direction) of the frame case 110 and perpendicular to the warp preventing portions 150. The protruding portion 130 in this embodiment is located in the base portion 111 of the first or second frame portion 110*a* or 110*b*. In this embodiment, the protruding portion 130 may protrude further than peripheral portions of the frame case 110. For example, in an embodiment, the protruding portion 130 may be a quadrangular shape smaller than the surrounding perimeter of the base portion 111, but the portion 130 may protrude further out than peripheral portions of the base portion 111.

The base portion 111 may include a SUS M metal material. In this embodiment, an inside the base portion 111 may be formed of a SUS M material. For example, in an embodiment, the base portion 111 may include resin R on respective upper and lower surfaces of the SUS M such that the SUS M is located between layers of resin R. In an embodiment, the side portion 112 may include only the resin R connected at an end portion of the base portion 111 such that the SUS M corresponds to the shape of, and is provided only at, the base portion 111 and not at the side portion 112. For example, in an embodiment, the frame case 110 may be formed of SUS M and resin R through an insert injection molding process. In an embodiment, the protruding portion 130 in the base portion 111 may be shaped to correspond to a shape of the SUS M to be protruded outward. The warp preventing portion 150 may be located in the frame case 110 by machining the shape of a mold in the insert injection molding, or by cutting away the frame case 110, after the insert injection molding process is complete.

Additional embodiments of the present invention will be described below with reference to FIGS. 5A, 5B, 6, 7A, and 7B. Descriptions of contents of the following embodiments, except the contents that are specifically described or designated, are similar to those of the embodiments described with reference to FIGS. 1 through 4, above, and therefore, their detailed descriptions will be omitted.

Figure 5A:
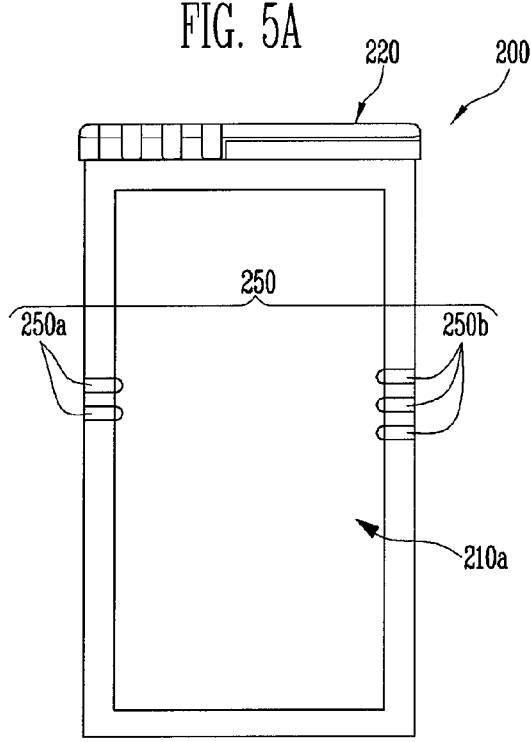
FIG. 5A is a front elevation view of a battery pack according to another embodiment of the present invention.
Figure 5B:
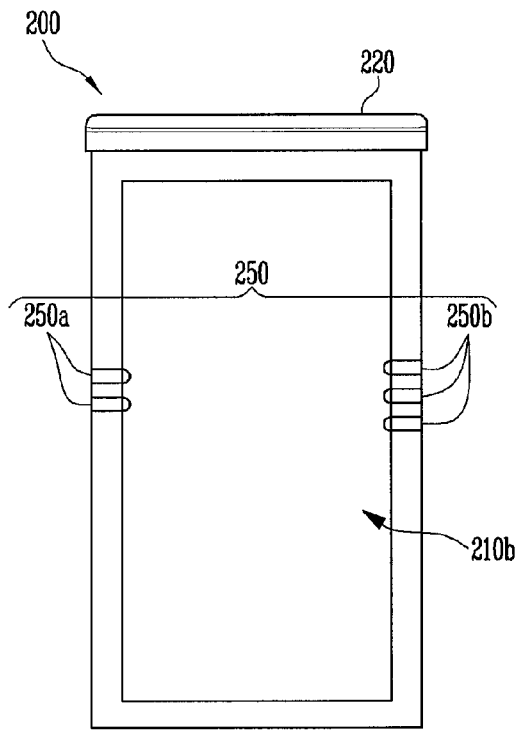
FIG. 5B is a rear elevation view of the battery pack according to the embodiment shown in FIG. 5A.

FIG. 5A is a front elevation view of a battery pack according to another embodiment of the present invention. FIG. 5B is a rear elevation view of the battery pack according to the embodiment shown in FIG. 5A.

Referring to FIGS. 5A and 5B, a battery pack 200 according to this embodiment may include a frame case 110 (as shown in FIGS. 1, 3A, 3B, 3C, and 4) formed by coupling first and second frame portions 210a and 210b to each other, and a top case 220 located at one end of the frame case 110. The first and second frame portions 210a and 210b in this embodiment are coupled to each other, defining a space therein. In this embodiment, one or more bare cells 10 may be accommodated in the space. First and second electrode tabs 12 (as shown in FIG. 2) protruding from each bare cell 10 may be electrically connected to a protective circuit module 122 (as shown in FIG. 2) located at the top case 220.

The battery pack 200 according to this embodiment may include warp preventing portions 250. The warp preventing portions 250 may be located in an outer surface of the frame case 110. In this embodiment, the warp preventing portions 250 may be spaced from one another in the frame case 110. For example, the warp preventing portions 250 may extend at a portion where the first and second frame portions 210a and 210b are coupled to each other. The warp preventing portions 250 may be located at each respective end the first or second frame portion 210a or 210b. In this embodiment, the warp preventing portions 250 may be provided in different forms. For example, two first warp preventing portions 250a spaced from each other may be located at one end of the first or second frame portion 210a or 210b, and three second warp preventing portions 250b spaced from one another may be located at the other end of the first or second frame portion 210a or 210b, such that the first and second warp preventing portions 250a and 250b may be located at each respective end of the first or second frame portion 210a or 210b. In an embodiment where the first and second frame portions 210a and 210b are coupled to each other, the first warp preventing portions 250a of the first frame portion 210a may face the second warp preventing portions 250b of the second frame portion 210b.

In the warp preventing portions 250 according to the embodiment described above, the forms of the first and second warp preventing portions 250a and 250b located at each respective end, i.e., the left and right sides, of the first or second frame portion 210a or 210b, are different from each other, and, thus, the first and second warp preventing portions 250a and 250b can be used as marks for identifying the position of the battery pack 200. Further, the first and second warp preventing portions 250a and 250b may provide differing durability or strength, allowing the battery pack 200 ample flexibility to overcome an external force applied to the frame case 110 during manufacturing.

Figure 6:
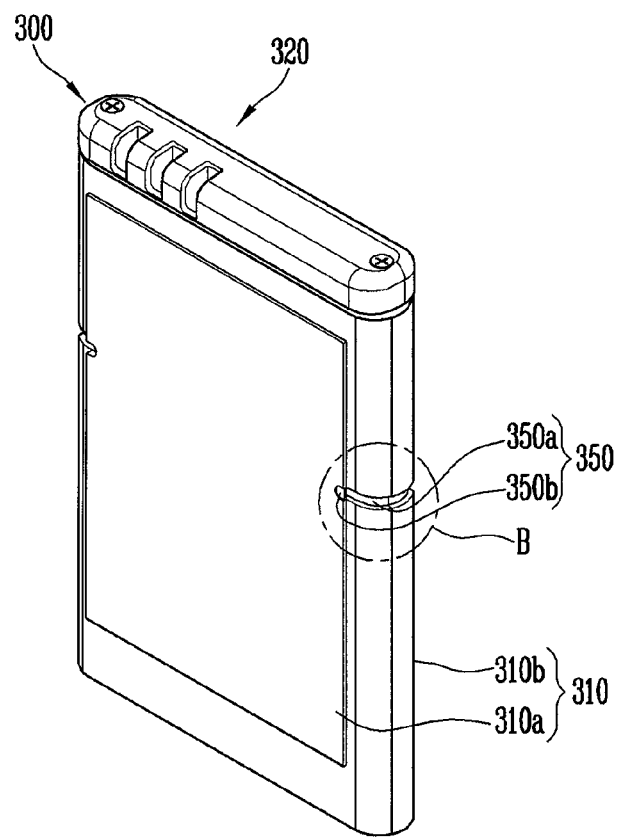
FIG. 6 is a front perspective view of a battery pack according to another embodiment of the present invention.
Figure 7A:
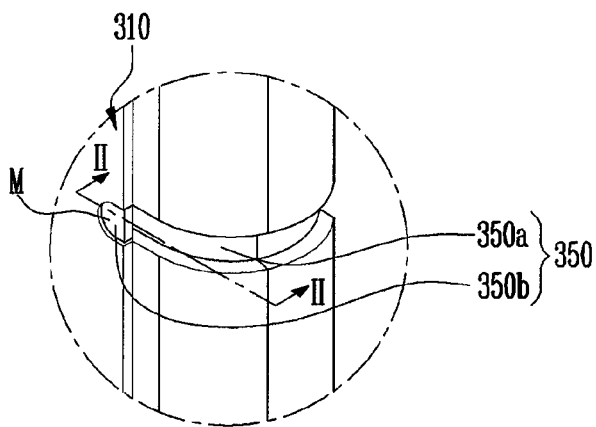
FIG. 7A is an enlarged view of portion B of the battery pack according to the embodiment of FIG. 6.
Figure 7B:
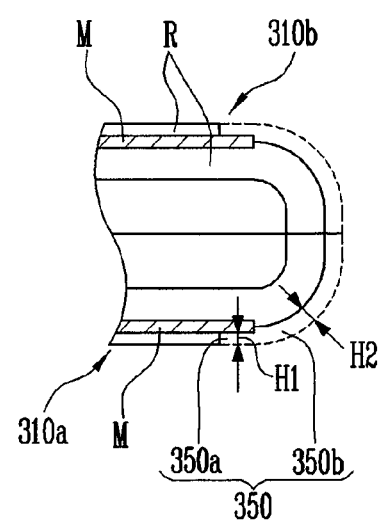
FIG. 7B is a cross-sectional view of the enlarged view of the battery pack according to the embodiment of FIG. 6 taken along line II-II of FIG. 7A.

FIG. 6 is a front perspective view of a battery pack according to another embodiment of the present invention. FIG. 7A is an enlarged view of portion B of the battery pack according to the embodiment of FIG. 6. FIG. 7B is a cross-sectional view of the enlarged view of the battery pack according to the embodiment in FIG. 6 taken along line II-II of FIG. 7A.

Referring to FIGS. 6, 7A, and 7B, a battery pack 300 according to this embodiment may include a frame case 310 configured to accommodate one or more bare cells 10 and surrounding an outer surface of the bare cells 10, and a top case 320 having a protective circuit module 122 (as shown in FIG. 2) at one end of the frame case 310, the protective circuit module 122 being configured to electrically connect to the bare cell 10. A warp preventing portion 350 may be included in an outer surface of the frame case 310. In this embodiment, the warp preventing portion 350 may be stepped inward from the outer surface of the frame case 310.

In this embodiment, a pair of first and second frame portions 310a and 310b, opposite each other, are coupled, forming the frame case 310. In this embodiment, the first and second frame portions 310a and 310b may be manufactured through insert injection molding, using, for example, a SUS M material and a resin R material. The warp preventing portion 350 may be located in the outer surface of the frame case 310, and may expose at least one portion of the SUS M therethrough. In the first or second frame portion 310a or 310b, the portion facing a wide surface of the bare cell 10 may include the SUS M material, and the resin R material may be formed on respective upper and lower surfaces of the SUS M material, the portion facing a side surface of the bare cell 10 including only the resin R material. In this embodiment, the warp preventing portion 350 includes a portion where the SUS M is located in the first or second frame portion 310a or 310b. The warp preventing portion 350 may extend to traverse a side portion 112 (as shown in FIGS. 3A, 3B, and 3c) of the first or second frame portion 310a or 310b.

The warp preventing portion 350 in this embodiment includes first and second stepped portions 350a and 350b, the first and second stepped portions 350a and 350b being stepped differently from each other. A depth H2 of the second stepped portion 350b measure from an outer surface of the first or second frame portion 310a or 310b may be deeper than a depth H1 of the first stepped portion 350a measured from the same outer surface of the first or second frame portion 310a or 310b. For example, the second stepped portion 350b may be located in the side portion 112 formed with only the resin R in the first or second frame portion 310a or 310b, and the first stepped portion 350a may be located in a region including both the SUS M and the resin R material in the first or second frame portion 310a or 310b. Thus, in this embodiment, at least one portion of the SUS M may be exposed at the first stepped portion 350a.

Example embodiments have been disclosed herein, and although specific terms are employed, they are used and are to be interpreted in a generic and descriptive sense only, and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
one or more bare cells, each bare cell having first and second electrode tabs;
a frame case surrounding an outer surface of the one or more bare cells, the frame case comprising a planar base portion and rounded side portions; and a top case coupled to the frame case at one end of the one or more bare cells, wherein the frame case includes a warp preventing portion parallel to the top case, the warp preventing portion being recessed towards the electrode assembly from an exterior-facing surface of the frame case, such warp preventing portion entirely traversing at least the rounded side portions of the frame case.

2. The battery pack of claim 1, wherein the frame case includes a rectangular section having a major axis and a perpendicular minor axis, and the warp preventing portion is recessed inward from an outer surface of the frame case, and
wherein the warp preventing portion is adjacent to a central portion of the major axis.

3. The battery pack of claim 1, wherein the frame case comprises opposite first and second frame portions.

4. The battery pack of claim 3, wherein each bare cell comprises a wide surface having a pair of minor axes opposite to each other and a perpendicular pair of major axes opposite to each other.

5. The battery pack of claim 1, wherein the base portion comprises a resin material surrounding upper and lower surfaces of a steel material such that the steel material is between the upper and lower surfaces of resin material, and wherein the side portion comprises resin material coupled to the base portion at an end portion.

6. The battery pack of claim 5, wherein the frame case comprises the steel material and the resin material formed through insert injection molding.

7. The battery pack of claim 1, wherein each of the first and second frame portions comprises a warp preventing portion, and
the warp preventing portion of each of the first and second frame portions are configured to connect to each other when the first and second frame portions are coupled to each other.

8. The battery pack of claim 1, wherein the warp preventing portion connects to at least a portion of the base portion.

9. The battery pack of claim 1, wherein the frame case further comprises one or more protruding portions extending parallel to the respective major axis of the frame case and protruding perpendicular to the warp preventing portions.

10. The battery pack of claim 9, wherein the base portion comprises the one or more protruding portions, the one or more protruding portions protruding further out from the base portion than each of the first and second frame portions.

11. The battery pack of claim 5, wherein the warp preventing portion at least partially exposes the steel material of the base portion.

12. The battery pack of claim 4, wherein the warp preventing portion is perpendicular to a major axis direction of the one or more bare cells.

13. The battery pack of claim 1, wherein the warp preventing portion comprises a plurality of warp preventing portions spaced apart from one another in the frame case.

14. The battery pack of claim 1, wherein the warp preventing portion is stepped.

15. The battery pack of claim 14, wherein the warp preventing portion comprises first and second stepped portions, and
wherein a depth of the second stepped portion is greater than a depth of the first stepped portion.

16. The battery pack of claim 4, wherein each bare cell has a length of at least 50 mm in the major axis direction, and
wherein at least one of the one or more bare cells comprises a pouch-type secondary battery.

* * * * *